US006912112B2

(12) United States Patent
Vo

(10) Patent No.: US 6,912,112 B2
(45) Date of Patent: Jun. 28, 2005

(54) REDUCED CAPACITANCE AND CAPACITIVE IMBALANCE IN SURGE PROTECTION DEVICES

(75) Inventor: Chanh C. Vo, Arlington, TX (US)

(73) Assignee: Corning Cable Systems LLC, Hickory, NC (US)

( * ) Notice: Subject to any disclaimer, the term of this patent is extended or adjusted under 35 U.S.C. 154(b) by 235 days.

(21) Appl. No.: 10/304,150

(22) Filed: Nov. 26, 2002

(65) Prior Publication Data

US 2004/0100743 A1 May 27, 2004

(51) Int. Cl.[7] .................................................. H02H 1/00
(52) U.S. Cl. ...................................................... 361/126
(58) Field of Search ............................ 361/126, 54, 56, 361/118, 119, 128, 117, 88, 91.2, 91.1

(56) References Cited

U.S. PATENT DOCUMENTS 3,742,419 A * 6/1973 Martzloff ..................... 338/20
4,494,163 A 1/1985 Yelland et al. ................ 361/56
5,557,065 A 9/1996 Brower et al. ............. 174/52.3
5,880,919 A 3/1999 Napiorkowski et al. .... 361/117
5,909,349 A * 6/1999 Brower et al. .............. 361/117
6,195,245 B1 * 2/2001 Kobsa ........................ 361/120
6,421,218 B1 7/2002 Vo et al. ..................... 361/117
6,421,220 B2 7/2002 Kobsa ........................ 361/120
6,501,634 B1 * 12/2002 Hubbell ...................... 361/124

* cited by examiner

*Primary Examiner*—Brian Sircus
*Assistant Examiner*—James A. Demakis
(74) *Attorney, Agent, or Firm*—Christopher C. Dremann

(57) ABSTRACT

Metal oxide varistors (MOVs) are employed in surge protection devices, such as overvoltage protection devices, between signal lines and ground to reduce the capacitance and the capacitive imbalance introduced by the overvoltage protector, thereby improving higher frequency transmissions, such as xDSL communications, over a twisted-pair telecommunications network. The MOVs can be stacked electrically in series to reduce the capacitance of each MOV and to reduce the variability, tolerance or spread of the capacitance between MOVs. Asymmetrical MOVs with electrodes having different surface areas can also be used to reduce capacitance and to reduce capacitive imbalance between MOVs. Furthermore, Asymmetrical MOVs, as well as MOVs with electrodes having the same surface area, can be stacked electrically in series. Such series stacked, asymmetrical, and series stacked asymmetrical MOVs can be used in parallel with a gas discharge tube to form, for example, a station protector for use at a customer premises.

27 Claims, 6 Drawing Sheets

FIG 9
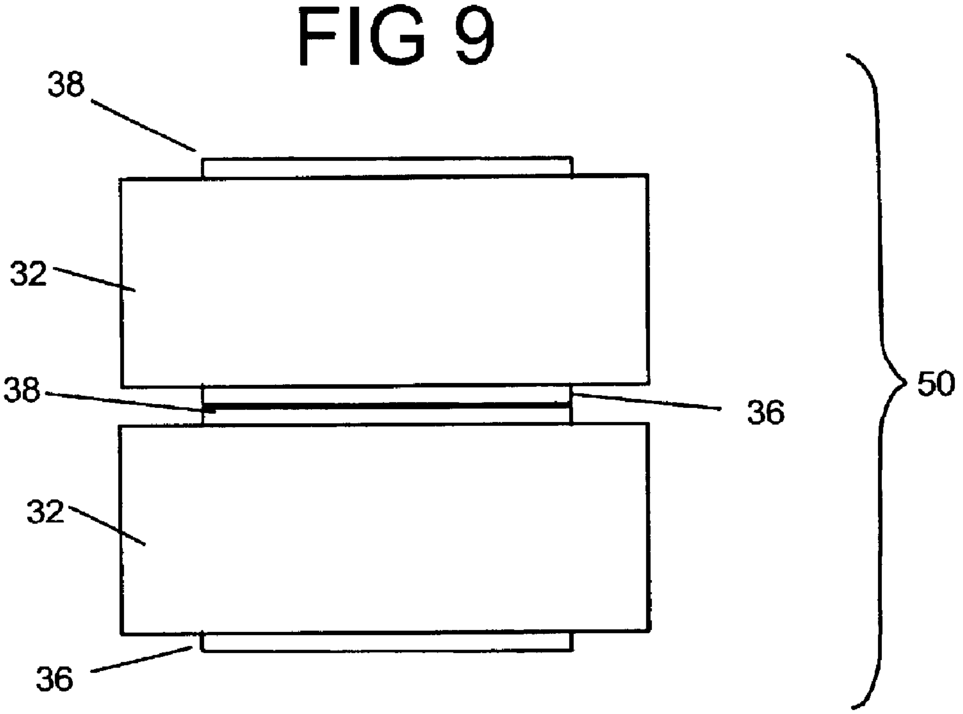
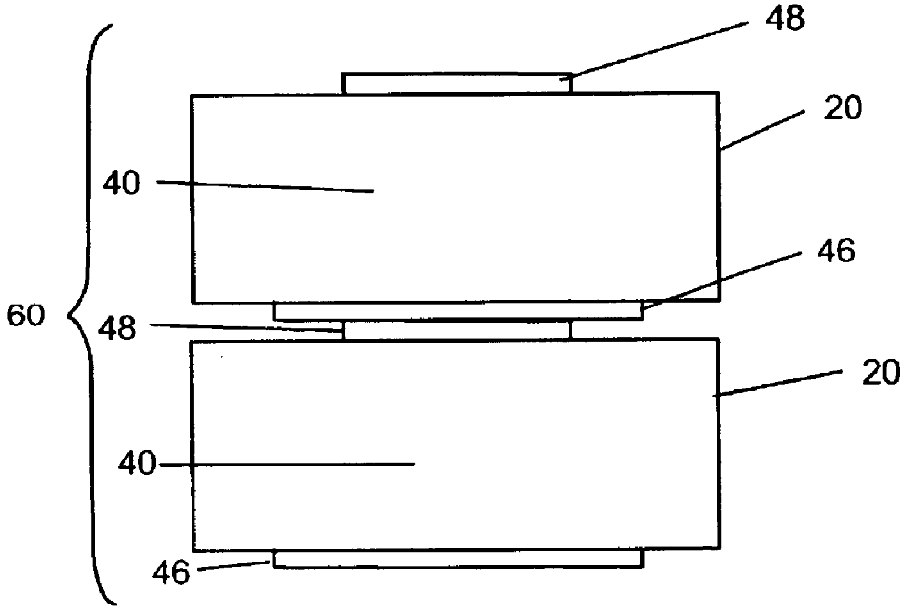
FIG 10

REDUCED CAPACITANCE AND CAPACITIVE IMBALANCE IN SURGE PROTECTION DEVICES

FIELD OF THE INVENTION

This invention is related to surge protection devices, and more particularly, overvoltage protection devices, that employ metal oxide varistors (MOVs) in station protectors, central office overvoltage protection devices, on-line overvoltage protection devices, and remote terminal overvoltage protection devices. In particular, this invention is related to the use of MOVs in overvoltage protection devices designed for digital subscriber line (DSL) transmissions, generically referred to as xDSL, such as very high data rate digital subscriber line (VDSL) communications.

BACKGROUND OF THE INVENTION

Conventional overvoltage protection devices typically use a gas tube, or gas discharge, surge arrestor as a primary means for diverting voltage surges from a signal line to ground. Examples of such devices are shown in U.S. Pat. Nos. 5,388,023, 5,500,782 and 5,880,919. Gas tubes dissipate energy by producing electrical arcing to ground. A gas of known dielectric strength is ionized when subjected to an electrical surge. One drawback of gas tubes, however, is that they typically exhibit a relatively slow response time and thus, may not be able to safely suppress fast rise time voltage surges. Metal oxide varistors (MOVs) have therefore been used as secondary protectors in back-up and interacting overvoltage protection devices. For example, in a conventional hybrid station protector, an MOV is electrically connected in parallel with the gas tube between each signal line. Although the gas tube can repeatedly dissipate voltage surges without damage, the response time of the MOV is faster than that of the gas tube. Therefore, the MOV can be relied upon to shunt fast rise time voltage surges to ground, while the parallel gas tube is relied upon to shunt sustained voltage surges, which might otherwise damage the MOV.

Overvoltage protection devices utilizing MOVs as secondary protectors have been successfully employed to protect conventional twisted-pair (i.e., "tip" and "ring") telecommunications lines. Broadband communications operate at transmission frequencies of at least 1 megahertz, which is substantially higher than the frequencies traditionally employed over twisted-pair telephone lines. Presently, frequencies of about 30 megahertz are typically utilized for xDSL communications transmitted over twisted-pair telephone lines. Existing twisted-pair telephone lines, also referred to as outside plant wire, are typically CAT-3 grade or less and were not intended for high frequency performance when originally manufactured or installed. Although xDSL communications are possible over existing twisted-pair telephone lines, in many instances conventional overvoltage protection devices are inadequate. This is especially the case when existing twisted-pair telephone signal lines are used for higher frequency digital transmissions, such as VDSL. Even if only a small number of overvoltage protection devices perform inadequately, the cost of identifying and replacing the overvoltage protection devices that may be adequate for lower frequency xDSL transmissions, but inadequate for higher frequency xDSL transmissions, is significant.

The inadequate performance of some conventional overvoltage protection devices, such as station protectors utilized at customer premises for higher frequency xDSL communications, has been traced to the greater capacitance and the variability of the capacitance of the MOVs that are employed in the station protector. At higher frequencies, the greater capacitance and the variability of the capacitance results in unacceptable insertion loss, return loss, and longitudinal imbalance. It is well known that the capacitance can be reduced by utilizing MOVs having the same thickness, but a smaller diameter. Many conventional station protectors employ 5 mm diameter MOVs with symmetrical 3.8 mm electrodes instead of smaller MOVs to absorb additional energy without causing permanent damage. MOVs of this size have a capacitance of about 60 picofarads with a tolerance of about 20 percent. This relatively large tolerance is believed to be due to variability in the varistor material and thickness, and/or to the relative placement and size of the electrodes on opposite sides of the varistor material. Electrodes, which are intended to be identical on both sides of the varistor material, can in practice be laterally displaced relative to each other. The concentricity of the two electrodes can also vary. Uneven placement and varying concentricity of the electrodes on opposite sides of the varistor material means that the overlapping surface area of the electrodes can vary significantly between MOVs that are intended to be identical, thereby generating dissimilar electric fields that result in relatively high capacitive tolerance, variability or spread. The difference in the capacitance of the MOV between the tip conductor and ground and between the ring conductor and ground results in significant capacitance mismatch, referred to herein as capacitive imbalance, which can cause excessive signal loss (e.g., insertion loss and return loss) and longitudinal imbalance at the higher frequencies utilized for xDSL communications transmitted over twisted-pair telephone lines.

As previously mentioned, it would be possible to reduce the capacitance between a signal line and ground in a station protector if an MOV having a smaller diameter was employed. Given the same thickness, because the smaller diameter MOV inherently has electrodes with smaller overlapping surface areas, the smaller diameter MOV also has less capacitance. However, a smaller diameter MOV is not able to withstand the same sustained current as a larger 5 mm diameter MOV. Furthermore, substitution of the smaller diameter MOV would result in significant engineering, re-tooling and testing expense. Even if the desired reduction in capacitance could be achieved by substituting a smaller diameter MOV for the 5 mm MOV presently in use, there could still be an excessive capacitive imbalance between the tip conductor and ground and the ring conductor and ground. Accordingly, it would be preferable if both a reduction in capacitance and a reduction in the capacitive imbalance could be achieved without the need for extensive modifications to conventional station protectors.

It has been determined that station protectors will perform satisfactorily for higher frequency xDSL communications over twisted-pair telephone lines if the capacitance across the MOV in parallel with the gas tube is reduced to about 30 picofarads with a capacitive tolerance among the MOVs of about ±0.25 picofarads. The number of existing station protectors and other overvoltage protection devices which are incapable of adequate performance is excessive, at least in the aggregate. In particular, when MOVs having relatively large capacitance and large capacitive tolerance are employed in twisted-pair telephone lines, an unacceptable capacitive imbalance between the tip conductor and ground and the ring conductor and ground will be present in an excessive number of station protectors. The capacitive imbalance for such station protectors has been found to be up to about 5 picofarads. For xDSL communications, including VDSL, a capacitive imbalance of less than about 1.3 picofarads is desired. Accordingly, what is needed is an MOV that reduces the capacitance and capacitive imbalance in an overvoltage protection device while sustaining the same current without permanent damage to the MOV. Such an MOV would provide adequate performance in a station protector or other overvoltage protection device utilized on twisted-pair telephone lines that transmit higher frequency xDSL communications, such as VDSL.

SUMMARY OF THE INVENTION

With this invention, the capacitance and the capacitive imbalance between signal lines in a surge protection device can be reduced when metal oxide varistors (MOVs) are employed in the surge protection device to protect personnel and telecommunications equipment against voltage surges. A surge protection device in accordance with this invention is used between at least one signal line and ground. The surge protection device includes one or more MOVs electrically connected between the signal line and ground. In one embodiment, two or more MOVs are stacked electrically in series between the signal line and ground so that the signal line is suitable for use in higher frequency transmissions, such as xDSL communications, including VDSL. Stacking two or more MOVs will not result in a significantly smaller capacitance relative to a single MOV having a diameter and thickness substantially the same as the diameter and thickness of the stacked MOVs. However, the variability of the capacitance will be less among the stacked MOVs than among the single MOVs. This smaller variability of the capacitance among stacked MOVs will result in less capacitive imbalance when stacked MOVs are used in a surge protection device for protecting two or more signal lines. Stacked MOVs can also be employed in parallel with a gas discharge tube to form a hybrid station protector suitable for use at the network interface between twisted-pair (i.e., “tip” and “ring”) telephone lines and the customer premises.

In another embodiment, the surge protection device includes an MOV with asymmetrical electrodes spaced apart on opposite sides of a varistor material. As used herein the term “asymmetrical” means that the electrodes have different surface areas. Misalignment of the electrodes is therefore less likely, and thus, the variability in capacitance among the asymmetrical MOVs is reduced. Because the overlapped surface area of the electrodes corresponds substantially to the surface area of the smaller electrode, the MOV has a smaller capacitance, as well as less variability, than an MOV of the same thickness having symmetrical electrodes. In addition, MOVs with asymmetrical electrodes can be stacked in the same manner as MOVs with symmetrical electrodes, which results in yet a further reduction in both capacitance and capacitive tolerance.

BRIEF DESCRIPTION OF THE DRAWINGS

FIG. 9 is an enlarged side view of two symmetrical MOVs stacked electrically in series that can be employed in the protector assembly shown in FIG. 3.

FIG. 10 is an enlarged side view of two asymmetrical MOVs stacked electrically in series that can likewise be employed in the protector assembly shown in FIG. 3.

DETAILED DESCRIPTION OF THE PREFERRED EMBODIMENTS

The preferred embodiments of the invention shown and described herein comprise surge protection devices, and in particular overvoltage protection devices, that are used at the interface between a telecommunications network and customer premises on telephone signal lines comprising conventional twisted-pair tip and ring conductors. Overvoltage protection devices, commonly referred to as station protectors, protect personnel and telecommunications equipment from voltage surges and overvoltage transients by shunting the voltage surges and transients to ground. However, the surge protection devices of this invention are not limited to station protectors, which comprise only the representative embodiments. Other surge protection devices, such as central office overvoltage protection devices, on-line overvoltage protection devices, and remote terminal overvoltage protection devices can also benefit from the reduced capacitance and reduced capacitive imbalance achieved by this invention. Furthermore, MOVs configured according to this invention may be packaged in any manner, for example mounted on a printed circuit board, and need not be confined to the station protectors shown and described herein.

The present invention can be utilized in back-up and interacting surge protection devices on twisted-pair telephone lines that employ both gas discharge tubes and MOVs electrically connected in parallel between the tip and ring conductors and a common electrical ground. The gas discharge tubes and MOVs provide alternative electrical paths to ground. The gas discharge tubes are often considered to be the primary electrical path between the signal line (e.g., tip or ring conductor in the case of twisted-pair telephone lines) and ground, because the gas discharge tube is able to repeatedly withstand high current surges. The response time of an MOV, however, is faster than the relatively slow response time of a gas discharge tube because of the time required to ionize the gas in the gas tube. Sustained or repeated currents will, however, tend to damage the MOV. In hybrid surge protection devices employing interacting varistors, the parallel combination of the gas discharge tube and the MOV will permit the surge protection device to respond to fast rise time surges or transients because the MOV will react until the gas discharge tube fires. The gas discharge tube provides the primary electrical path to ground and protects the MOV because the MOV will not be subjected to sustained or repeated high currents. In other hybrid surge protection devices, MOVs having a much larger DC breakdown voltage than a gas discharge tube provide back-up surge protection in case of damage to the gas discharge tube (e.g., venting). This invention can be employed with either back-up or interacting hybrid surge protection devices.

Figure 1:
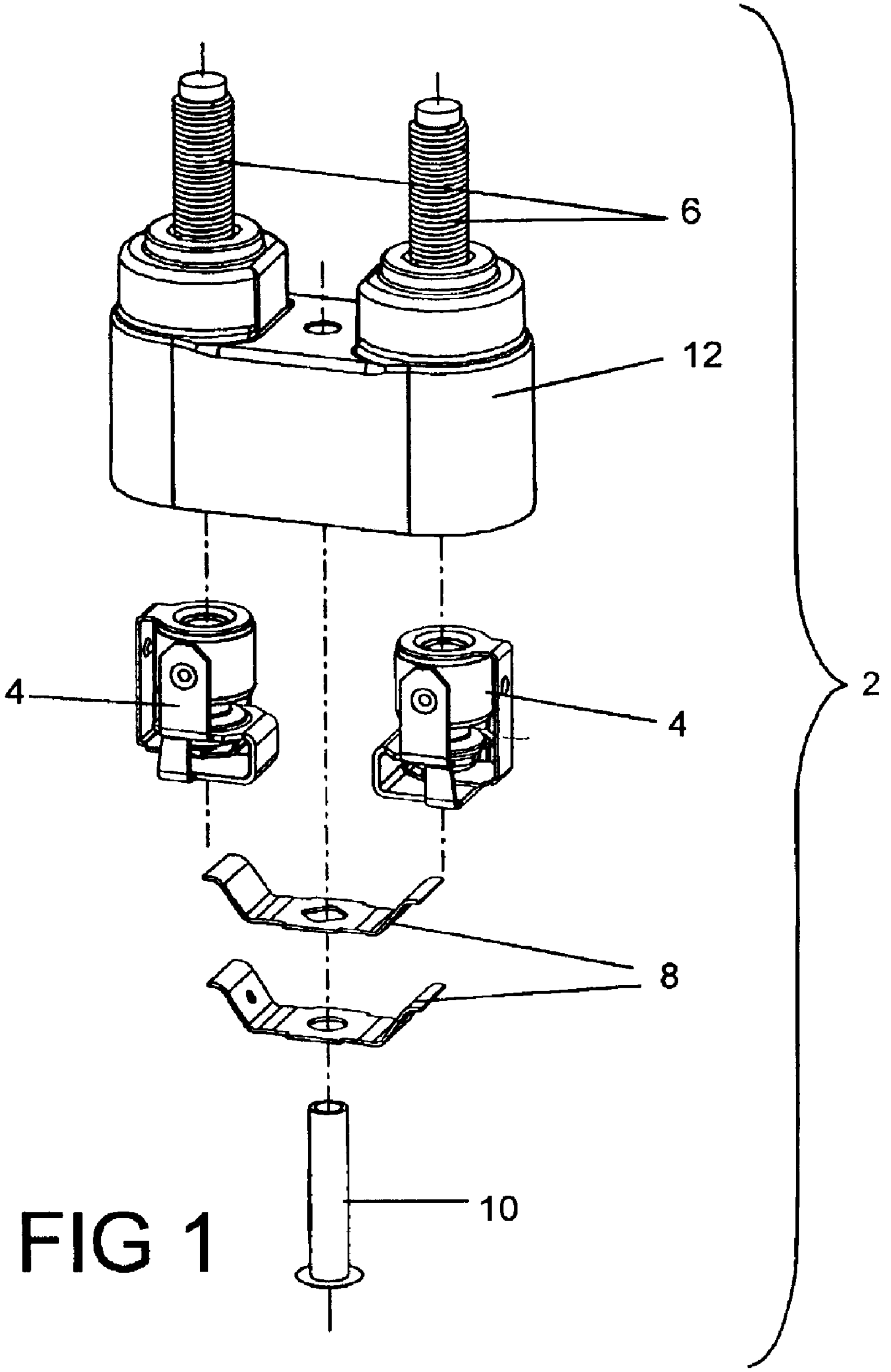
FIG. 1 is an exploded perspective view of a surge protection device, and in particular, a station protector of the type that can be configured to employ metal oxide varistors (MOVs) according to this invention.
Figure 2:
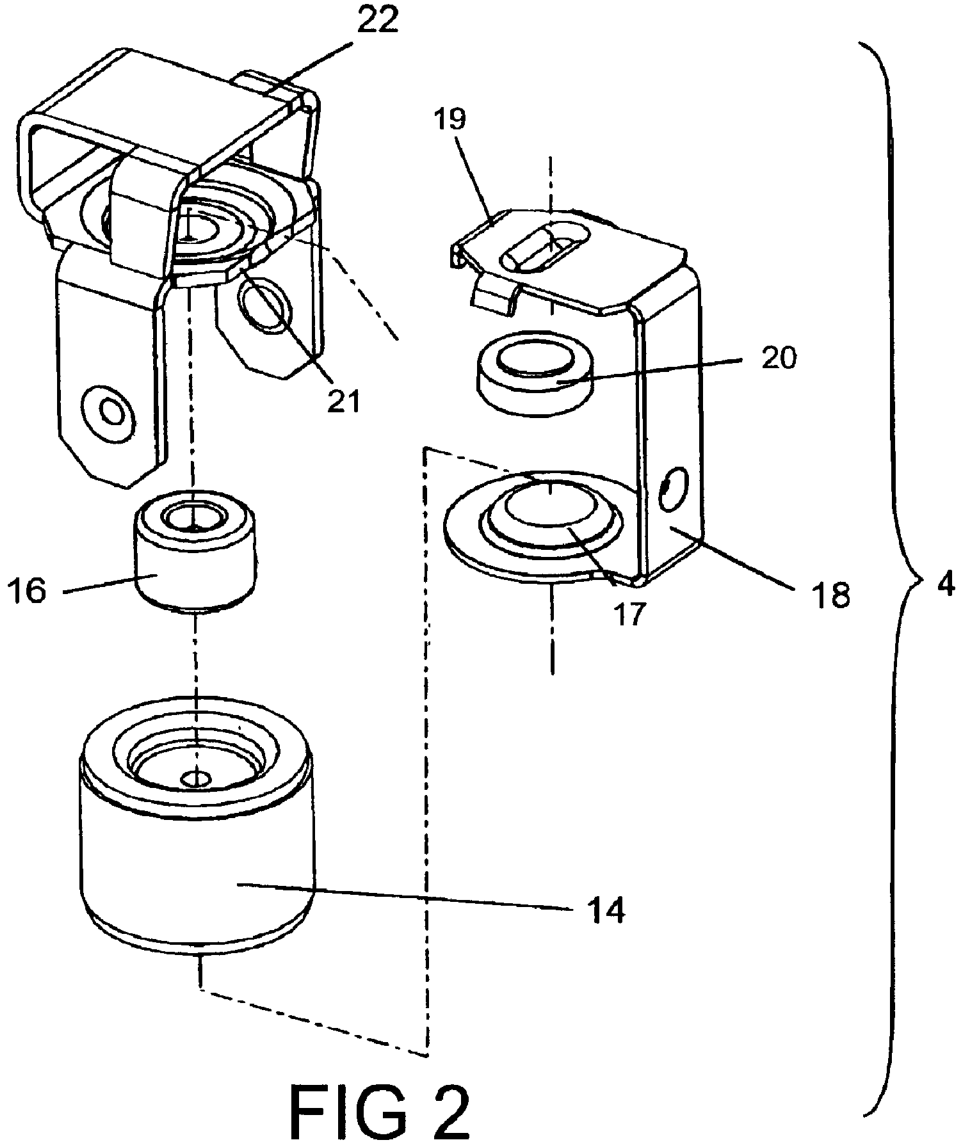
FIG. 2 is an exploded perspective view of a protector assembly comprising an asymmetrical MOV that can be employed in the station protector shown in FIG. 1.
Figure 3:
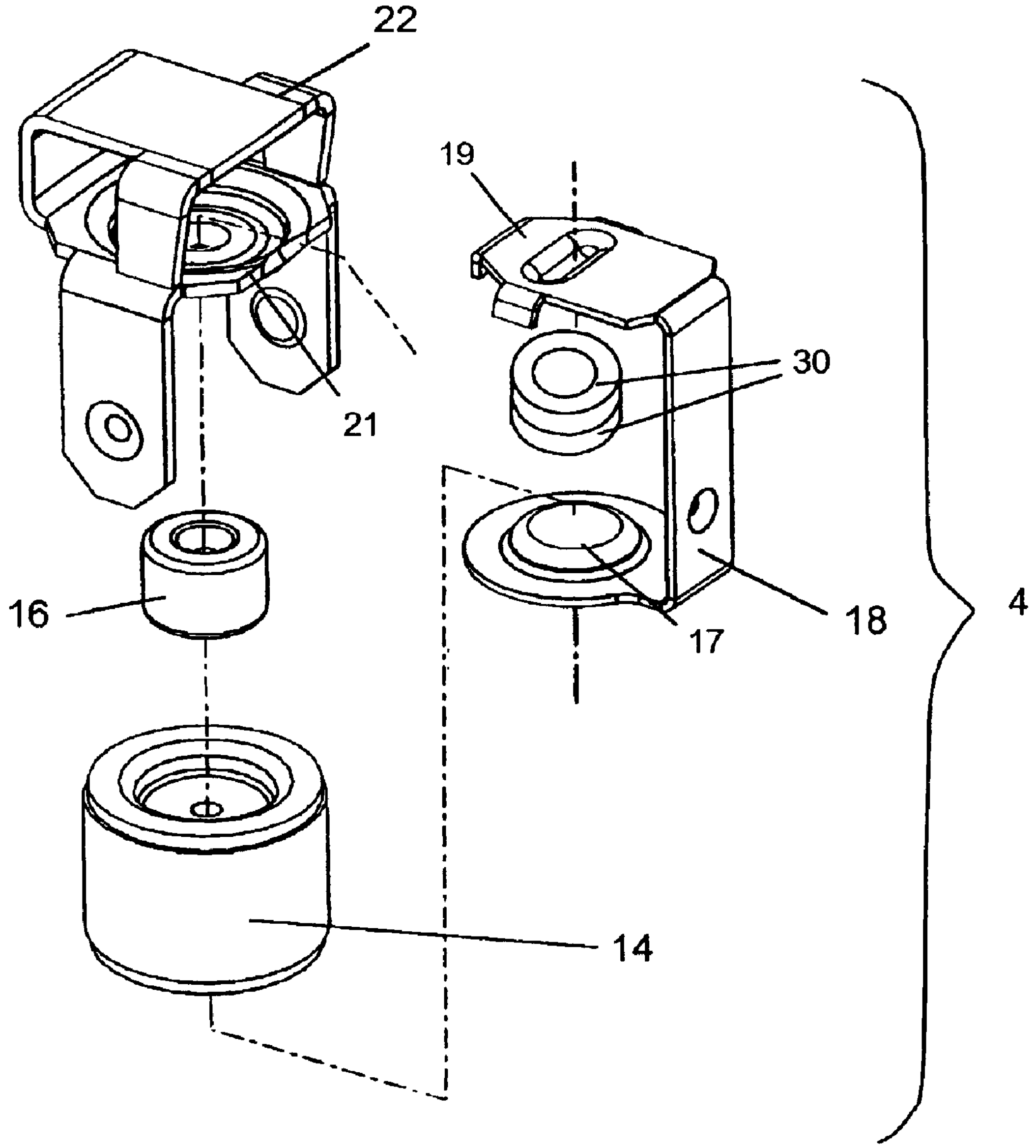
FIG. 3 is an exploded perspective view of an alternate protector assembly comprising two MOVs stacked electrically in series that can be employed in the station protector shown in FIG. 1.

An example of an overvoltage protection device in the form of a hybrid station protector comprising a protector assembly employing a gas discharge tube and at least one MOV is shown in FIG. 1. The gas tube and the MOV are electrically connected in parallel between a signal line and ground. Two embodiments of a protector assembly that can employ one or more MOVs according to the invention in the station protector of FIG. 1 are shown in FIG. 2 and FIG. 3, respectively. The protector assemblies shown in FIGS. 2 and 3 are commonly referred to as a two-element gas tube protector assembly. Three-element gas tube protector assemblies can also employ MOVs according to this invention, but need not be separately discussed because the invention is employed in the same manner for a two-element gas tube protector assembly as a three-element gas tube protector assembly. The only significant difference between a three-element gas tube protector assembly and a two-element gas tube protector assembly is that the tip and ring conductors share a common gas chamber and a common ground terminal, as is well known in the art and therefore need not be described in greater detail.

Figure 4:
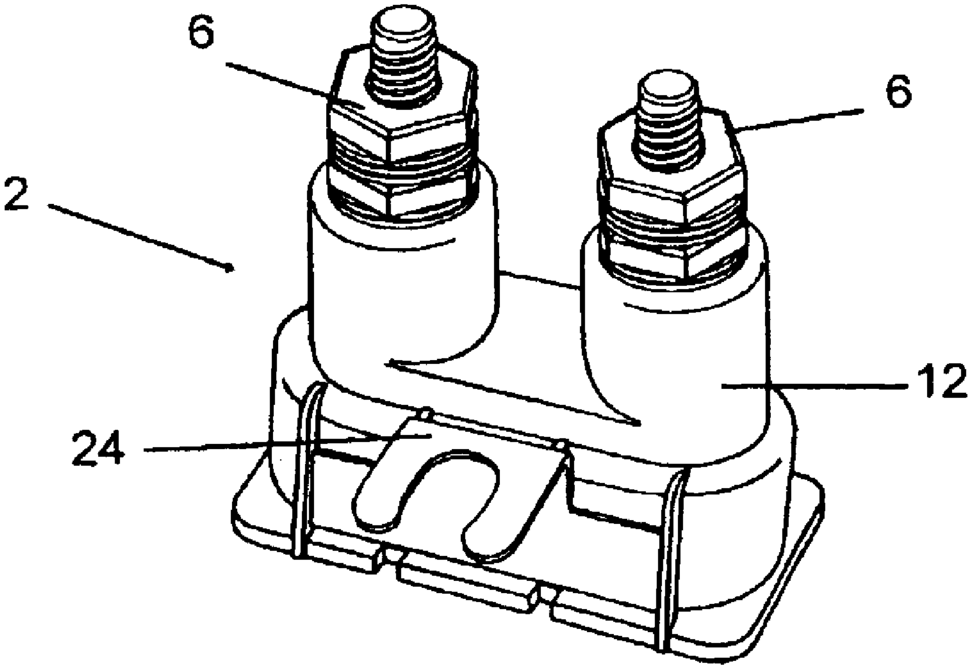
FIG. 4 is a perspective view of a fully assembled station protector according to this invention.
Figure 5:
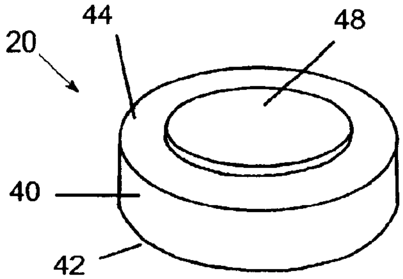
FIG. 5 is an enlarged perspective view showing the smaller of the two electrodes on an asymmetrical MOV that can be used in the protector assembly of FIG. 2.
Figure 6:
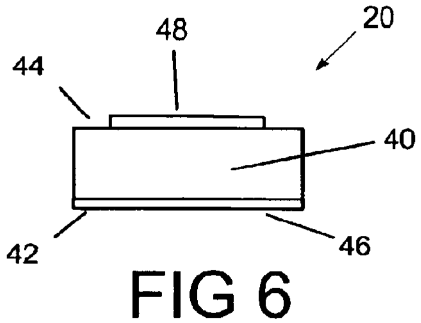
FIG. 6 is an enlarged side view showing both the smaller electrode and the larger electrode of the asymmetrical MOV shown in FIG. 5.
Figure 7:
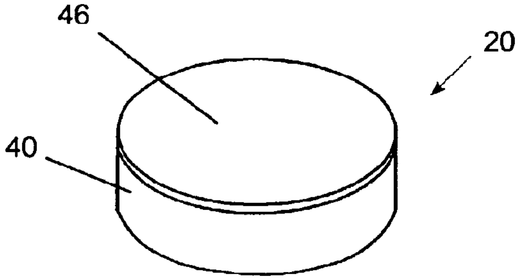
FIG. 7 is an enlarged perspective view showing the larger of the two electrodes on the asymmetrical MOV shown in FIGS. 5 and 6.

Station protector 2 as shown in FIG. 1 includes two protector assemblies 4 that are positioned within a generally hollow housing 12 in electrical contact with two corresponding conductive terminals 6. Preferably, station protector 2 is of the type commercially available from Corning Cable Systems of Hickory, North Carolina, such as Model SPD-126. The terminals 6 provide means for separately connecting the protector assemblies 4 to the tip conductor (not shown) and the ring conductor (not shown) of a twisted-pair telephone line suitable for use in a telecommunications network. The tip conductor is electrically connected to one of the terminals 6 and the ring conductor is electrically connected to the other terminal 6. A pair of ground springs 8 urge the protector assemblies 4 upwardly within the housing 12 into engagement with the corresponding lower ends of the terminals 6. A cylindrical conductive pin 10 is in contact with and extends upwardly through the pair of ground springs 8. The pin 10 can be riveted in place to form at least a portion of an electrical path between each protector assembly 4 and a ground terminal, such as ground terminal 24, shown in FIG. 4.

The two protector assemblies 4 shown in FIGS. 2 and 3 are substantially the same except for the configuration of the MOV 20 and the MOVs 30, respectively, employed in the station protector 2. The protector assembly 4 shown in FIG. 2 employs a single MOV with asymmetrical electrodes. Accordingly, the MOV 20 is also referred to herein as "asymmetrical MOV 20." The protector assembly 4 shown in FIG. 3 employs two MOVs 30 stacked in series and electrically connected between one of the terminals 6 and the ground terminal 24. Accordingly, the MOVs 30 are also referred to herein as "series stacked MOVs 30." The series stacked MOVs 30 is preferably limited to two MOVs 30 stacked electrically in series, however, the series stacked MOVs 30 may comprise any number of two or more MOVs 30 stacked electrically in series. Furthermore the series stacked MOVs 30 can comprise either MOVs with symmetrical electrodes, such as a conventional MOV with electrodes on opposite sides of a varistor material having the same surface area, or two asymmetrical MOVs 20 with electrodes on opposite sides of the varistor material having different surface areas, as will be described with reference to FIGS. 9 and 10.

The primary protector in the protector assemblies 4 shown in FIG. 2 and FIG. 3 is a gas discharge tube 14. Accordingly, in the exemplary station protector shown in FIG. 1, a first primary protector 14 is electrically connected between one of the terminals 6 and the ground terminal 24, and a second primary protector 14 is electrically connected between the other terminal 6 and the ground terminal 24. As is well known, inert gas within gas discharge tube 14 will ionize when subjected to a voltage surge of sufficient energy, thereby forming an electrical path between the signal line subjected to the voltage surge and ground. In the preferred embodiments of the invention shown herein, a conventional gas discharge tube, such as a Model N-80-C400X, manufactured by EPCOS of Berlin, Germany, is utilized. However, any other commercially available two-element or three-element gas discharge tube is suitable. In each protector assembly 4, the gas discharge tube 14 is electrically connected in parallel with at least one MOV, such as the single asymmetrical MOV 20 shown in FIG. 2, or the two series stacked MOVs 30 shown in FIG. 3. The varistor material forming the body of MOV 20 and MOVs 30 is substantially nonconductive below a predetermined energy, but rapidly becomes conductive when subjected to a voltage surge above the predetermined energy. Thus, the gas discharge tube 14 and the MOV 20 or MOVs 30 form two parallel paths between a signal line electrically connected to terminal 6 and ground terminal 24 when subjected to a voltage surge. In alternative embodiments of the invention not shown and described herein, other mechanical, electrical and solid state clamping devices may be substituted for the gas discharge tube 14, such as an air gap, resistor, inductor, thyristor, diode, and the like.

An MOV spring 18 and a fail safe contact 22 formed from conductive materials retain the gas discharge tube 14 and the MOV 20 or MOVs 30. The MOV 20 or the MOVs 30 are positioned between a top portion 19 of the MOV spring 18 and a central web 21 on the fail safe contact 22. The gas discharge tube 14 is positioned between the central web 21 and the bottom portion 17 of the MOV spring 18. The MOV spring 18 urges the asymmetrical MOV 20 or the series stacked MOVs 30 toward the central web 21 of the fail safe contact 22. The electrodes on the opposite sides of the asymmetrical MOV 20 or the series stacked MOVs 30 engage the top portion 19 of the MOV spring 18 and the central web 21 of the fail safe contact 22. However, the composition of the varistor material prevents conduction through the MOV until the signal line is subjected to a voltage surge of sufficient energy for the varistor material to become conductive and shunt the voltage surge to ground. A fusible member 16 is positioned between the central web 21 of the fail safe contact 22 and the gas discharge tube 14. The fusible member 16 is normally formed of a eutectic solder so that it will rapidly soften and flow when subjected to a predetermined temperature. However, the fusible member 16 may be made of plastic or any other suitable material that softens and flows sufficiently to permit the gas discharge tube 14 to electrically contact the central web 21 of the fail safe contact 22. Once the fusible element 16 softens and flows, the MOV spring 18 urges the failsafe contact 22 in the direction of the gas discharge tube 14 so that the failsafe contact 22 electrically contacts the terminal 6 and shorts the protector assembly 4 to the ground terminal 24 through ground springs 8 and pin 10, thereby diverting the voltage surge to electrical ground.

Since the asymmetrical MOV 20 and the series stacked MOVs 30 are not conductive under normal circumstances, there will be a capacitance introduced by the MOV 20 or MOVs 30 between the tip conductor and ground and between the ring conductor and ground. If these capacitances differ, there will be a capacitive imbalance that exists between the electrical path from the tip conductor to ground and the electrical path from the ring conductor to ground. Capacitive imbalance is typically not problematic at lower frequencies, but results in excessive signal loss (e.g., insertion loss and return loss) and longitudinal imbalance at higher frequencies. As will be discussed hereinafter in greater detail, MOV 20 with asymmetrical electrodes will both reduce capacitance and will have less variability in capacitance (also referred to herein as capacitive tolerance), than conventional MOVs (i.e., MOVs having symmetrical electrodes). Similarly, series stacked MOVs 30 having symmetrical electrodes on opposite sides of the varistor material will likewise reduce the capacitance and the variability of capacitance among MOVs that can cause capacitive imbalance. Series stacked MOVs 30 having asymmetrical electrodes on opposite sides of the varistor material will even further reduce the capacitance and capacitive tolerance of the MOVs, and thus, the potential capacitive imbalance among MOVs, thereby statistically improving the performance of the station protector 2 at higher frequencies.

FIGS. 5–8 show one embodiment of an MOV 20 with asymmetrical electrodes 46 and 48 on opposite sides of body 40 formed of a varistor material, such as zinc oxide or other semi-conductive material used in conventional MOVs. The larger electrode 46 covers substantially the entire surface of the side 42 of the body 40. The smaller electrode 48, however, covers only a portion of the surface of opposite side 44 of the body 40. Opposite sides 42, 44 and opposite electrodes 46, 48 are substantially parallel and, with the exception of the fact that the first electrode 46 is larger than the second electrode 48, the MOV 20 is of substantially conventional construction. The electrodes 46 and 48 are positioned on the sides 42 and 44 of the body 40 using any one of a number of conventional fabrication techniques. For example, in the preferred embodiments of the invention shown and described herein, the electrodes 46 and 48 are vapor deposited onto the outwardly facing surfaces of sides 42 and 44, respectively. In these representative embodiments, the electrodes 46, 48 are generally circular. However, other shapes could be employed. Furthermore, it is not necessary that the electrodes 46, 48 on opposite sides 42, 44 of the same asymmetrical MOV 20 even have the same shape. For example, at least one of the electrodes 46, 48 could have a square, rectangular, oval, diamond, star or annular (i.e., ring) shape.

Figure 8:
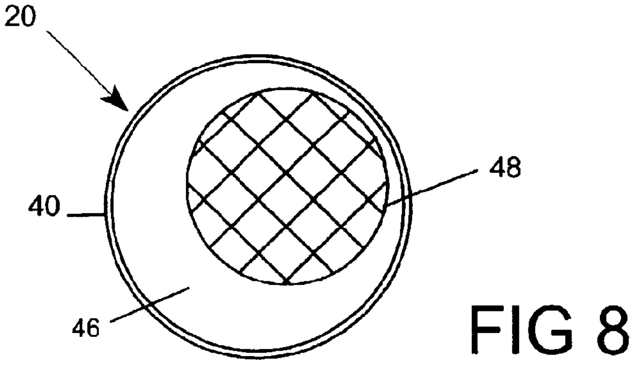
FIG. 8 is an enlarged plan view of an asymmetrical MOV in which the overlapped surface area of the two electrodes is represented by cross-hatching.

In one preferred embodiment, the asymmetrical MOV 20 has a diameter of about 5 mm, and the larger electrode 46, which covers substantially the entire surface of the side 42, also has a diameter of about 5 mm. As previously mentioned, MOVs of the type used in conventional station protectors typically have a diameter of only about 3.8 mm. Since the larger electrode 46 covers substantially the entire side 42 of the varistor material, it will completely overlap the surface area of the smaller electrode 48, regardless of the size, shape or lateral placement of the smaller electrode 48 on the side 44. FIG. 8 shows that the overlapped surface area of the two electrodes 46, 48, which is represented by the cross-hatched area 47, will always be equal to the surface area of the smaller electrode 48, even if the smaller electrode is offset laterally relative to the center of the body 40 defined by the varistor material. For purposes of illustration only, this lateral offset is greatly exaggerated in FIG. 8. In the embodiment shown in FIGS. 5–8, the diameter of the smaller electrode 48 is preferably about 1.9 mm, which is approximately the same size as the symmetrical electrodes of a conventional 3 mm MOV. Given the same thickness of varistor material, the asymmetrical MOV 20 will therefore have a capacitance that is less than the capacitance of a conventional 5 mm MOV, but will have a greater current handling capacity than smaller MOVs. It is not necessary that the larger electrode 46 cover the entire surface of the side 42 of the varistor material. In fact, manufacturing considerations may in some cases require that the electrode be at least slightly smaller than the side 42. In a commercial embodiment, for example, a larger electrode 46 having a diameter of about 3.5 mm is used with a smaller electrode 48 having a diameter of about 1.9 mm to achieve a significant reduction in capacitance and capacitive tolerance.

FIG. 9 and FIG. 10 show two different versions of series stacked MOVs 50, 60, respectively. In the embodiment shown in FIG. 9, a series stacked MOV 50 having two substantially identical MOVs 32 stacked electrically in series is shown. Each MOV 32 is symmetrical with the electrodes 36, 38 on opposite sides of the varistor material having the same surface area. Sufficient normal forces are applied externally to the MOVs 32 so that electrical continuity is maintained between the adjacent electrodes of the MOVs 32. Alternatively, a thin film of solder can be applied between the adjacent electrodes to bond the MOVs 32 together. Although the two MOVs 32 forming the series stacked MOV 50 shown herein are in physical contact, it should be understood that MOVs 32 can be stacked in series according to the invention even if the adjacent electrodes are not in direct physical contact. A reduction in the variability, tolerance or spread of the capacitance for an MOV subassembly can also be achieved if the MOVs 32 are physically separated and merely electrically connected in series.

FIG. 10 shows two MOVs 20 with asymmetrical electrodes stacked electrically in series according to the invention. In this embodiment, the smaller electrode 48 of the lower MOV 20 is in direct physical contact with the larger electrode 46 of the upper MOV 20. Alternatively the two smaller electrodes 48 could be adjacent one another in opposed relationship and direct physical contact (or merely electrically connected in series), or the two larger electrodes 46 could be positioned adjacent one another in opposed relationship and direct physical contact (or merely electrically connected in series). In the embodiment shown in FIG. 10, the smaller electrodes 48 have a diameter of about 1.9 mm and the larger electrodes 46 have a diameter of about 3.5 mm. The diameter of the body 40 defined by the varistor material is about 5 mm. Thus, the larger electrode 46 does not cover the entire surface area of the varistor material, as previously described with reference to the embodiment shown in FIGS. 5–8.

Surge protection devices according to this invention are not limited to the station protectors shown in FIGS. 1–4 or to the exemplary MOV subassemblies shown in FIGS. 5–8, 9 and 10. However, station protectors of the type shown and described herein facilitate the use of twisted-pair telecommunications lines for xDSL communications, including VDSL. This invention achieves that result by reducing the capacitance introduced by a surge protection device, such as a station protector, and by reducing any capacitive imbalance introduced between the tip conductor and ground and the ring conductor and ground. Although higher frequency broadband communications are possible for twisted-pair telecommunications lines utilizing conventional station protectors that do not incorporate this invention, the variability of conventional station protectors means that a number of conventional station protectors will not perform adequately for higher frequency transmissions. This inadequate high frequency performance of surge protection devices that perform satisfactorily in lower frequency transmissions requires replacement of at least some conventional station protectors before satisfactory broadband and xDSL communications can be achieved.

If the surge protection device is to be used to form separate paths to ground for two conductors, such as the tip and ring conductors in a twisted-pair telephone line, capacitive imbalance becomes an issue. In station protectors used to shunt voltage surges from the tip conductor to ground and/or from the ring conductor to ground at the network interface to the customer premises, separate MOVs are used between tip and ground and between ring and ground. If the capacitances of these two MOVs differ, capacitive imbalance is introduced between the tip and ring conductors. The difference in capacitance between MOVs used in the two shunt paths is reduced according to this invention by employing MOVs stacked electrically in series, by employing MOVs with asymmetrical electrodes, or by employing MOVs with asymmetrical electrodes stacked electrically in series.

It has been found that the capacitance introduced by the addition of an MOV to a surge protection device can be reduced by employing multiple MOVs stacked electrically in series. As used herein, the terms “stacked in series” or “electrically stacked in series” refer to two or more MOVs that are electrically connected in series, whether or not the electrodes of adjacent MOVs are in physical contact with one another. Preferably, the MOVs are pressed together or joined by a conductor, for example solder, such that the electrodes of adjacent MOVs are in direct physical contact. If two MOVs are stacked in series between a signal line and ground, the resultant capacitance will be less than the capacitance of a single MOV having substantially the same diameter and electrodes of substantially the same surface area as the stacked MOVs. The total capacitance of the stacked MOVs is determined in accordance with the following relationship:

$$C_{total}=(C_1C_2/(C_1+C_2))$$

If $C_1=C_2=C$, then $C_{total=1/2}C$

It then follows that one way to reduce the capacitance introduced by an MOV of conventional construction would be to stack at least two MOVs having substantially the same diameter and electrodes of substantially the same overlapped surface area in series between a signal conductor and ground. In addition to reducing the total capacitance, the standard deviation due to the variability among supposedly identical MOVs will also be reduced. In particular, the standard deviation (σ) of the total capacitance of the stacked MOVs (i.e., $C_{total=1/2}C$) will be $V_2$ the standard deviation of C in accordance with the following relationship:

σof ax=a(σx) where a is constant and x is variable; therefore $$\sigma_{Ctotal}=a\sigma_c=_{1/2}\sigma_c.$$

The standard deviation is a conventional measurement demonstrating the variability of the capacitance among supposedly identical MOVs. This relationship has been confirmed experimental by testing 230V, 5 mm MOVs with symmetrical 2.7 mm electrodes on opposite sides of a varistor material. The capacitance @ 1 MHz/0 Vdc Bias for two sets of twenty-five individual MOVs yielded the following results:

| | Set 1 | Set 2 |
|---|---|---|
| Average | 34.55 | 34.89 |
| Stdev | 0.84 | 0.99 |
| Min | 33.20 | 33.20 |
| Max | 37.10 | 37.90 |
| +3σ | 37.08 | 37.87 |
| −3σ | 32.03 | 31.91 |

When one of the MOVs from set 1 was pressed together with the corresponding MOV from set 2 such that the two MOVs were stacked electrically in series, the total capacitance was determined and the following results were obtained:

| | |
|---|---|
| Average | 17.99 |
| Stdev | 0.42 |
| Min | 17.17 |
| Max | 18.80 |
| +3σ | 19.24 |
| −3σ | 16.74 |

The MOVs used for this test may or may not be the desired size for use in a particular surge protection device, such as a station protector for the tip and ring conductors of a twisted-pair telephone line. Nevertheless, these results confirm that the total capacitance and the variability of the capacitance can both be reduced by series stacking MOVs. Three or more series stacked MOVs will further reduce the total capacitance and the variability of the capacitance, but the reduction due to the addition of each MOV will not be as large.

Even though the capacitance will be reduced by stacking two or more MOVs in series, this reduction in capacitance will not necessarily be a means of effectively lowering the capacitance across a surge protection device, such as a station protector. Although the total capacitance will be lowered by incorporating additional MOVs in a series stack, the additional MOVs will also affect the electrical performance of the station protector. The voltage necessary to trigger the MOV will be greater for the stacked MOVs than for a single MOV of the same type used in the stack. A station protector comprising a stack of MOVs will therefore not respond to the same voltage as would a station protector comprising a single MOV. Of course, MOVs with proportionally smaller thicknesses can be stacked, and the electrical performance will be substantially the same as for a single MOV having the same thickness as the overall thickness of the stacked MOVs, at least insofar as response to a voltage surge. However, stacking MOVs will, relative to a single MOV having the same thickness as the overall thickness of the stacked MOVs, still reduce the variability of the capacitance, a desirable result when used with twisted-pair telecommunications lines for higher frequency transmissions.

MOVs can be stacked by placing two MOVs with the adjacent electrodes of the MOVs in electrical contact. A suitable electrical contact can be achieved by applying sufficient external force to the MOVs so that reliable electrical conduction can be maintained without the application of solder or other electrically conductive bonding means. Of course, adjoining electrodes could also be soldered together, especially if a stacked MOV subassembly is to be fabricated prior to subsequent assembly in a station protector or other surge protection device. If solder is to be applied, care should be taken to prevent the solder from extending laterally beyond the perimeter of the either electrode and to limit the occurrence of any voids in the solder joint. Excess solder could result in an effective enlargement of the surface area of the electrodes with a resultant increase in the capacitance and the variability of capacitance of the series stacked MOVs.

The variability of the capacitance among MOVs to be used in a surge protection device can also be reduced by modifying the structure of the MOV. One reason for relatively large capacitive tolerance for an MOV is misalignment of the electrodes on opposite sides of the varistor material. Misalignment can occur when the two electrodes are laterally displaced or when one or both of the electrodes is misshapen (e.g., not concentric. The electric field generated between the two electrodes will not be the same when the two electrodes are misaligned as when the two electrodes are properly aligned because the overlapped surface area of the electrodes will be different. Since capacitance is a function of the electric field generated in a nonconductive material between two spaced apart, conductive electrodes, the capacitance will also be a function of the relative alignment of the two electrodes. The varistor material will be nonconductive under normal conditions. Therefore, the capacitance introduced by the MOVs will be a function of the electric field generated between two electrodes that cannot be positioned relative to each other consistently with a level of precision that does not adversely affect higher frequency transmissions, such as xDSL communications, including VDSL.

Even if the exact placement of two electrodes on opposite sides of an MOV cannot be adequately controlled by conventional manufacturing techniques, it is nevertheless possible to position asymmetrical electrodes in a manner such that the electric field will not vary significantly for MOVs of the same overall size and shape. One way to accomplish this result is to fabricate one of the two electrodes so that its surface area will be substantially larger than the surface area of the other electrode. If one electrode is large enough, then regardless of the position of the smaller electrode, the larger electrode will completely overlap the smaller electrode. In other words, the perimeter of the larger electrode will extend laterally to or beyond the perimeter of the smaller electrode. Therefore, regardless of the placement of the smaller electrode, the electric field generated between the electrodes will have essentially the same size and shape, since the electric field will be primarily confined to the volume of the varistor material between the overlapped surface areas of the electrodes. If the larger electrode covers the entire surface of one side of the varistor material, then the lateral placement of the smaller electrode will not significantly affect the capacitance of the MOV. Since the surface area of the electrode can be more readily controlled then its precise placement, asymmetrical electrodes can be used to overcome capacitive variability due to imprecise placement.

Furthermore, the capacitance of the MOV can be varied by utilizing asymmetrical electrodes having different surface areas. For example, the capacitance of the MOV can also be reduced by reducing the surface area of the smaller electrode, since the size and shape of the electric field generated between the two electrodes will be dependent upon the surface area of the smaller electrode and will be relatively independent of the surface area of the larger electrode. Thus, use of an asymmetrical MOV with a smaller electrode overlapped by a larger electrode will reduce both the capacitance of each MOV and the capacitive imbalance due to the introduction of different MOVs electrically connected between the tip conductor and ground and between the ring conductor and ground. A further improvement can be achieved by stacking two or more asymmetrical MOVs electrically in series between the tip conductor and ground and/or between the ring conductor and ground in a station protector or other surge protection device.

The capacitance of twenty individual 230V, 5 mm MOVs having symmetrical 3.8 mm electrodes on opposite sides of a varistor material was measured and the average capacitance and standard deviation of the population determined. The capacitance of twenty individual 230V, 5 mm MOVs having asymmetrical electrodes on opposite sides of the same varistor material comprising a smaller 1.9 mm electrode overlapped by a larger 3.5 mm electrode was then measured and the average capacitance and the standard deviation of the population determined. The data reproduced below illustrates that the average capacitance of the asymmetrical MOVs was approximately one-half the average capacitance of the symmetrical MOVs and the standard deviation of the asymmetrical MOVs was approximately one-quarter the standard deviation of the symmetrical MOVs. Pairs of the symmetrical MOVs and pairs of the asymmetrical MOVs were then stacked electrically in series and the same characteristics determined. The data reproduced below illustrates that further reductions in both the total capacitance and the variability of the capacitance among asymmetrical MOVs can be achieved by stacking asymmetrical MOVs electrically in series.

| 230 V, 5 mm symmetrical MOVs with 3.8 mm electrodes | | | 230 V, 5 mm asymmetrical MOVs with 1.9 mm and 3.5 mm electrodes | | |
|---|---|---|---|---|---|
| No | Single | Stack | No | Single | Stack |
| 1 | 49.5 | 25.2 | 1 | 23.9 | 11.7 |
| 2 | 49.5 | | 2 | 24 | |
| 3 | 49.6 | 25.2 | 3 | 24.2 | 11.9 |
| 4 | 49.5 | | 4 | 24 | |
| 5 | 54.4 | 26.1 | 5 | 24.4 | 12 |
| 6 | 49.2 | | 6 | 24 | |
| 7 | 49.6 | 25.1 | 7 | 23.1 | 11.7 |
| 8 | 48.8 | | 8 | 24.2 | |
| 9 | 49.5 | 25 | 9 | 23.7 | 11.8 |
| 10 | 48.8 | | 10 | 23.6 | |
| 11 | 49.4 | 25.1 | 11 | 23.9 | 12 |
| 12 | 49.6 | | 12 | 24.1 | |
| 13 | 49.3 | 25 | 13 | 23.4 | 11.7 |
| 14 | 49.3 | | 14 | 24.1 | |
| 15 | 49.1 | 24.9 | 15 | 24.3 | 12.1 |
| 16 | 49.3 | | 16 | 24.1 | |
| 17 | 49.6 | 25 | 17 | 23.9 | 11.9 |
| 18 | 49.2 | | 18 | 23.8 | |
| 19 | 48.9 | 24.6 | 19 | 24.4 | 12.1 |
| 20 | 48.2 | | 20 | 24.1 | |
| Max | 54.4 | 26.1 | Max | 24.4 | 12.1 |
| Min | 48.2 | 24.6 | Min | 23.1 | 11.7 |
| Average | 49.5 | 25.1 | Average | 24.0 | 11.9 |
| Stdev | 1.20 | 0.39 | Stdev | 0.32 | 0.16 |

Furthermore, based on the above data, it can be expected that a reduction in total capacitance and variability of capacitance among MOVs can be achieved by stacking a symmetrical MOV and an asymmetrical MOV electrically in series.

As previously discussed, the invention is not intended to be limited to the representative embodiments depicted herein. The exemplary embodiments shown and described herein are illustrative of the particular benefits obtained when the invention is incorporated into a surge protection device, such as a station protector, utilized on twisted-pair telecommunications lines for higher frequency transmissions, such xDSL communications, including VDSL. However, it is anticipated that the invention can provide similar benefit when utilized in connection with any electrical device employing one or more MOVs wherein a reduction in capacitance or capacitive tolerance is desired. The invention is defined more broadly by the following claims, which include other structures and embodiments that would be apparent to one of ordinary skill in the art. Thus, the scope of the invention should not be limited to the above description, but instead, should be construed as broadly as possible in accordance with the appended claims.

That which is claimed is:

1. A protector assembly for use in a surge protection device, the protector assembly comprising at least one metal oxide varistor (MOV) subassembly comprising at least one MOV having first and second electrodes on opposite sides of a varistor material that do not have substantially the same surface area and are the only electrodes on each respective side, the capacitive tolerance among two or more such MOV subassemblies being less than the capacitive tolerance among two or more MOVs having substantially the same diameter and thickness as the MOV subassembly and first and second electrodes on opposite sides of the varistor material that do have substantially the same surface area.

2. A protector assembly according to claim 1 wherein the capacitance of the MOV subassembly is less than about 30 picofarads and the capacitive tolerance among the two or wore such MOV subassemblies is less than about ±0.25 picofarads.

3. A protector assembly according to claim 1 further comprising a primary protector and wherein the MOV subassembly defines a secondary protector in parallel with the primary protector between a signal line and ground.

4. A protector assembly according to claim 3 wherein the primary protector is a gas discharge tube.

5. A protector assembly according to claim 1 comprising a first MOV subassembly electrically connected in parallel with a first primary protector between a first signal line and ground and a second MOV subassembly electrically connected in parallel with a second primary protector between a second signal line and ground, the capacitance of the first MOV subassembly and the capacitance of the second MOV subassembly being less than about 30 picofarads and the capacitive imbalance between the first MOV subassembly and the second MOV subassembly being less than of about 1.3 picofarads.

6. A protector assembly according to claim 5 wherein the first primary protector and the second primary protector are gas discharge tubes and wherein the first signal line and the second signal line are the tip and ring conductors, respectively, of a conventional twisted-pair telecommunications line.

7. A protector assembly according to claim 1 wherein the MOV subassembly is mounted within a station protector at a customer premises for protecting personnel and telecommunications equipment from a voltage surge on a twisted-pair telephone line utilized for xDSL communications.

8. A surge protection device for use with electrical transmission lines, the surge protection device comprising at least two metal oxide varistors (MOVs) stacked electrically in series between at least one of the electrical transmission lines and around to reduce any capacitive imbalance introduced by the surge protection device and thereby reduce signal loss during transmissions greater than about 1 megahertz, wherein each of the MOVs comprises a varistor material defining a body having a first side and a second side opposite the first side, a first electrode on the first side of the body, and a second electrode on the second side of the body, and wherein the capacitance of each of the MOVs is determined substantially by the surface area of the second electrode.

9. A surge protection device according to claim 8 wherein the first electrode has a larger surface area than the second electrode.

10. A surge protection device according to claim 9 wherein the surface area of the first electrode overlaps the surface area of the second electrode such that the perimeter of the surface area of the second electrode is substantially entirely within the perimeter of the surface area of the first electrode.

11. A surge protection device according to claim 9 wherein the surface area of the first electrode covers substantially the entire surface of the first side of the body.

12. A surge protection device for use with electrical transmission lines, the surge protection device comprising:

at least two metal oxide varistors (MOVs) stacked electrically in series between at least one of the electrical transmission lines and around to reduce any capacitive imbalance introduced by the surge protection device and thereby reduce signal loss during transmissions greater than about 1 megahertz; and a primary protector electrically connected in parallel with the MOVs stacked electrically in series.

13. A surge protection device according to claim 12 wherein the primary protection device is a gas discharge tube.

14. A surge protection device for use between a signal line and ground, the surge protection device comprising at least one asymmetrical metal oxide varistor (MOV) with first and second electrodes on opposite sides of a varistor material, the first and second electrodes each having a different sized surface area such that the capacitance of the asymmetrical MOV is determined substantially by the surface area of the smaller of the first and second electrodes, wherein the first electrode is the only electrode on its side and the second electrode is the only electrode on its side.

15. A surge protection device according to claim 14 wherein the surface area of the first electrode is larger than the surface area of the second electrode and wherein the perimeter of the surface area of the second electrode is substantially entirely within the perimeter of the surface area of the first electrode.

16. A surge protection device according to claim 14 wherein the surface area of the first electrode has substantially the same shape as the surface area of the second electrode, but the size of the surface area of the first electrode is substantially different than the size of the surface area of the second electrode.

17. A surge protection device for use between a signal line and ground, the surge protection device comprising:

at least one asymmetrical metal oxide varistor (MOV) with first and second electrodes on opposite sides of a varistor material, the first and second electrodes each having a different sized surface area such that the capacitance of the asymmetrical MOV is determined substantially by the surface area of the smaller of the first and second electrodes, wherein the at least one asymmetrical MOV comprises a first asymmetrical MOV electrically connected in parallel with a first primary protector between a first signal line and ground and a second asymmetrical MOV electrically connected in parallel with a second primary protector between a second signal line and ground, the capacitance of the first asymmetrical MOV and the capacitance of the second asymmetrical MOV being less than about 30 picofarads and the capacitive imbalance between the first asymmetrical MOV and the second asymmetrical MOV being less than of about 1.3 picofarads.

18. A surge protection device according to claim 17 wherein the first primary protector and the second primary protector are gas discharge tubes and wherein the first signal line and the second signal line are the tip and ring conductors, respectively, of a conventional twisted-pair telecommunications line.

19. A surge protection device according to claim 17 wherein at least one asymmetrical MOV is mounted within a station protector at a customer premises for protecting personnel and telecommunications equipment from a voltage surge on a twisted-pair telephone line utilized for xDSL communications.

20. A metal oxide varistor (MOV) comprising:

a varistor material having oppositely facing, spaced apart first and second sides, a first electrode on the first side, wherein the first electrode is the only electrode on the first side; and a second electrode on the second side, wherein the second electrode is the only electrode on the second side;

wherein the first electrode has a larger surface area than the surface area of the second electrode.

21. A metal oxide varistor according to claim 20 wherein the surface area of the first electrode extends over substantially the entire first side of the varistor material and the surface area of the second electrode extends over less than the entire second side of the varistor material so that the surface area of the first electrode overlaps substantially the entire surface area of the second electrode regardless of the placement of the second electrode on the second side.

22. A station protector for protecting against a voltage surge on a twisted-pair telephone line comprising tip and ring conductors that is used for higher frequency transmissions, such as xDSL communications, the station protector comprising a ground terminal;

first and second terminals electrically connected to the tip and ring conductors;

a first MOV subassembly electrically connected between the first terminal and the ground terminal;

a second MOV subassembly electrically connected between the second terminal and the ground terminal;

wherein the first MOV subassembly and the second MOV subassembly each has a capacitance no greater than about 30 picofarads and the first and second MOV subassemblies have a capacitive imbalance no greater than about 1.3 picofarads.

23. A station protector according to claim 22 wherein the first MOV subassembly and the second MOV subassembly each comprise two or more MOVs with first and second electrodes on opposite sides of a varistor material that are electrically stacked in series.

24. A station protector according to claim 22 wherein the first MOV subassembly and the second MOV subassembly each comprise an MOV with first and second electrodes on opposite sides of a varistor material that have different sized surface areas.

25. A station protector according to claim 22 wherein the first MOV subassembly and the second MOV subassembly each comprise an MOV with first and second electrodes on opposite sides of a varistor material that have different sized surface areas and that are electrically connected in series.

26. A station protector according to claim 22 further comprising at least one gas discharge tube electrically connected between the first terminal and the ground terminal and between the second terminal and the ground terminal.

27. A station protector according to claim 26 wherein the at least one gas tube is electrically connected in parallel with the first MOV subassembly between the first terminal and the ground terminal and in parallel with the second MOV subassembly between the second terminal and the ground terminal.

* * * * *